Patented Feb. 22, 1944

2,342,581

UNITED STATES PATENT OFFICE 2,342,581

WATER-REDUCIBLE PAINT

Gilbert F. Hoffmann, Waukesha, Wis., assignor to O'Neil-Duro Company, Milwaukee, Wis., a corporation of Wisconsin No Drawing. Application March 24, 1939,
Serial No. 263,907

3 Claims. (Cl. 260—16)

This invention relates to improvements in water-reducible paints of the emulsion type and to an improved method of compounding the same. More particularly, the invention resides in an emulsion paint and the method of compounding the same wherein there is produced an internal lacquer, oil, resin, or varnish phase, as the cases may be, and a special pigment-bearing or pigment-contacting external phase, which, by reason of a high content of a water-dispersable derivative of cellulose, such as methyl cellulose, imparts to the paint desirable properties not heretofore obtainable.

The new paint of this invention is water-reducible, i. e., may be thinned simply by addition of water. When spread to form a coating and permitted to dry, the film converts to a lacquer, resin, oil, or varnish film, as the case may be, which film is insoluble in water and is as resistant to aqueous detergents as films formed by conventional paints.

The paint of this invention is possessed of superior brushing qualities, which it retains over a wide range of reduction with water, and these advantages are retained independently, to a large measure, of the viscosity of the substances constituting the dispersed phase. This is a particular advantage because binders of the best durability and wearing qualities may be selected without the usual rigid regard to viscosity characteristics. This greatly widens the field of suitable binders.

The paint of this invention also has distinct advantages from the standpoint that it may be applied by brush, spray, or roller, to surfaces of varying porosity to produce a uniform gloss without appearance of "suction spots."

The paint of this invention, even when reduced with appreciable quantities of water, is surprisingly free of the tendency to "strike in," which is so characteristic of many conventional paints and water-reducible paints. For this reason the paint of this invention may be employed as a sealing coat, if desired, on plaster, concrete, and similar materials, over which recoating with the same or other paint may be applied. This may be done as soon as the coating is dry to the touch without waiting for further drying, which is often necessary with other paints.

The paint of this invention, further, may be applied to moist or damp surfaces without danger of subsequent cracking and peeling, which generally occurs when conventional paints are so utilized. The base to which the paint of this invention is applied is not damaged by undue penetration of the fluids contained therein, a difficulty experienced with many water-reducible compositions.

In addition, the paint of this invention possesses high spreading and covering properties and excellent brushing characteristics, while at the same time producing a coating of superior wearing properties, and these and many other advantages which are the object of this invention are procured by the novel composition and method of compounding the same herein described.

It is the discovery of this invention that an internal or dispersed phase consisting of an oleoresin selected from the group comprising drying oil, long-oil modified resin, oil, resin, lacquer, and varnish, when formed in an aqueous dispersion medium containing pigment and a very substantial amount of methyl cellulose and, if desired, a small amount of butyl carbitol, that coating material having the above advantages is obtained. It is well known that dispersions have heretofore been prepared with the pigment contained in the dispersed oleo-resin phase. A wide range of emulsifying agents have been employed to stabilize these dispersions. In the novel composition of this invention, however, the methyl cellulose, or other suitable cellulose derivative, is present in quantities substantially in excess of the quantity required for emulsifying agent purposes and this appears to bring about an entirely new result, namely, the carrying of the pigment in the dispersion medium while at the same time imparting to the new composition several important novel properties desired.

In aid of the description of this invention, specific instances thereof are hereinafter set forth by way of illustration and not of limitations.

As an instance, a "flat wall" paint may be prepared in accordance with this invention, as follows:

*Aqueous dispersion medium*

About 5 parts by weight of methyl cellulose, or other suitable water-dispersible derivative of cellulose, is first dispersed in 95 parts of water to form a colloidal solution. To this is added a small amount, say $\frac{1}{100}$ to 2 parts by weight of an acid, say phosphoric acid. The amount of acid is not critical so long as it is sufficient to render the solution slightly acid. Into this solution there is introduced, by grinding, silica pigment, titanium dioxide, and asbestine, but any other suitable pigment may be substituted, in whole or in part, therefor. For example, color pigments, such as iron oxide, ochre, ultra marine blue, and many others may be used. Preferred proportions for these ingredients have been found to be about 14 parts by weight of cellulose derivative solution, 15 parts silica pigment, 10 parts titanium dioxide, and 5 parts asbestine. These proportions may, of course, be widely varied and pigments other than those named may be employed.

*Oleo-resin dispersed phase*

Into the aqueous medium there is then introduced an oleo-resin material made up of alkyd resin (such as General Electric Co. 2464) and linseed oil or other suitable modifying oil mixed in approximately equal parts by weight, to which there has been added a small amount of suitable drier solution, such as cobalt drier solution. Preferred proportions have been found to be $1^{39}/_{64}$ gallons of oil-modified resin and $^{25}/_{64}$ gallons of cobalt drier solution.

One part by volume of the oleo-resin material is then thoroughly beaten into one part by volume of the aqueous dispersion medium by vigorous mixing or agitation, whereupon it becomes dispersed in the form of emulsion droplets. When thoroughly dispersed, a small amount of water may then be mixed in to produce the desired consistency. As a final step, or as a previous step, there may be added a small amount, say $1/10$ to 2 per cent, on the basis of the weight of the aqueous dispersion medium, of butyl carbitol to reduce creeping tendency on lyophobic surfaces. While specific proportions of ingredients above mentioned have been given, it will be found that desirable results may be obtained with $1/2$ to 10 per cent of methyl cellulose, or other water-dispersible derivative of cellulose contained in the aqueous dispersion medium. Also, the weight of pigment per gallon of aqueous dispersion medium may vary from very small amounts up to 50 pounds, depending upon the hiding power required. Also, the ratio of dispersed oleo-resin content to aqueous dispersion medium may vary from one part by volume of oleo-resin to 20 parts of aqueous medium to 5 parts oleo-resin to 1 part of aqueous medium.

As another specific instance of a paint made in accordance with this invention, an "outside white" paint may be compounded as follows:

*Aqueous dispersion medium*

18 pounds of methyl cellulose solution is prepared as in the previous example, into which is ground 16 pounds of white lead (such as National Lead Co., #111), 4 pounds of titanium dioxide or antimony oxide and 2 pounds of asbestine.

*Dispersed oil phase*

Into the aqueous dispersion medium is then placed, with the aid of vigorous mixing, $1^{5}/_{16}$ gallons of bodied linseed oil containing a suitable amount of drier. As in the case above, a small proportion of butyl carbitol may be included in the composition. When the dispersion of the oil is complete the paint is ready for use with or without reduction with additional water. Here again proportions of ingredients may be varied in a manner to be guided by the results desired within ranges comparable to those stated in connection with the instance set forth above.

As a further instance and by employing the steps as above recited, a "sanding undercoat" may be prepared from suitable ingredients over a wide range of proportions thereof. A preferred composition may contain proportions of ingredients, as follows:

*Aqueous dispersion medium*

2 gallons methyl cellulose solution prepared as in the first example, to which there is added 10 pounds talc, 5 pounds silica pigment, and 5 pounds titanium pigment.

*Oleo-resin dispersed phase*

1 gallon hard drying varnish or synthetic resin solution. After dispersion of the oleo-resin, additional water may be incorporated to produce the desired consistency. Here again a small addition of butyl carbitol will result in improved properties.

In the instances above cited, the pigment is added to the aqueous phase, in contact with which it remains in the finished paint, although some of the pigment may be lodged at the interface between oleo-resin globules and the aqueous dispersion medium. It is, however, a specific feature of the paint of this invention that the pigment need not be immersed in the oleo-resin phase. For special purposes, in addition to the pigment contained in the aqueous dispersion medium, some pigment immersed in the oleo-resin phase may be desired and such a composition may be prepared without departing from this invention.

The superior hiding power and resistance to water after dry of a coating formed from a paint of this invention appears to be due to a breaking of the emulsion upon drying, whereby a continuous oleo-resin film becomes established into which the pigment particles finally become permanently embedded. The freedom from striking-in exhibited by the composition, on the other hand, appears to be due to the colloid properties of methyl cellulose used in appreciable amounts, this material not only serving to stabilize the emulsion, but also serving the very important function of rendering the aqueous medium non-penetrating. It further appears probable that the colloidal properties of the methyl cellulose used in appreciable amounts assists in holding the pigment in suspension in the aqueous phase, which seems an important factor in making possible a paint which is neutral or even slightly acid. This is in strong contrast with those older emulsion paints, which become unstable if not maintained alkaline. As a consequence, a much wider range of pigments may be successfully employed in the paint of this invention, since pigments inherently acid in character may be used without difficulty. By way of example, a pigment such as Prussian blue may be employed without any difficulty. Further, absence of alkalinity in the paint of this invention may be availed of to render the oleo-resin film produced thereby more resistant to weather.

While there has been set forth above instances of specific use of this invention, it is intended that the same be by way of illustration only and that the protection of Letters Patent granted thereon be not unduly limited thereby, but that such protection shall extend to the full limit of the advance herein disclosed as represented by the scope of the claims hereto appended.

I claim as my invention:

1. In a high pigment water-reducible paint, the composition consisting of from 20% to 50% by weight of finely divided solid matter as pigment, from 30% to 75% by weight of slightly acid water as a dispersing medium for said pigment, from 0.25% to 4% by weight of methyl cellulose colloidally dissolved in said water, and from 5% to 30% by weight of oleo-resinous varnish dispersed as an internal dispersed phase in said water and emulsified therein with the aid of said methyl cellulose.

2. In a high pigment water-reducible paint, the composition consisting of from 20% to 50% by weight of finely divided solid matter as pigment, from 30% to 75% by weight of slightly acid water as a dispersing medium for said pigment, from 0.25% to 4% by weight of methyl cellulose colloidally dissolved in said water, and from 5% to 30% by weight of oil-modified alkyd resin-containing dryer as a binder dispersed as an internal dispersed phase in said water and emulsified therein with the aid of said methyl cellulose.

3. In a water-reducible paint, a suspension consisting of a slightly acid aqueous suspension medium containing methyl cellulose in colloidal solution, finely divided solid pigment suspended in said suspension medium, an oleo-resinous varnish dispersed in minute globules and also suspended in said suspension medium, said varnish and said pigment forming two separate and distinct suspended phases, the water content of said suspension medium constituting approximately one-half the entire composition by weight, the methyl cellulose constituting approximately 1% by weight of the entire composition, the pigment constituting approximately one-third of the entire composition by weight, and the varnish constituting the remainder.

GILBERT F. HOFFMANN.